United States Patent [19]
Kim et al.

[11] Patent Number: 6,151,508
[45] Date of Patent: Nov. 21, 2000

[54] REVERSE POWER CONTROL METHOD IN A CELLULAR SYSTEM

[75] Inventors: Gun-yeob Kim, Yongin; Pyeong-hwan Wee, Seoul, both of Rep. of Korea

[73] Assignee: SamSung Electronics, Co., Ltd., Seoul, Rep. of Korea

[21] Appl. No.: 09/394,356

[22] Filed: Sep. 11, 1999

[30] Foreign Application Priority Data

Sep. 15, 1998 [KR] Rep. of Korea ................ 98-38062

[51] Int. Cl.[7] ........................................... H04B 7/00
[52] U.S. Cl. .................. 455/522; 455/69; 455/67.1; 455/13.4
[58] Field of Search .................. 455/67.1, 69, 117, 455/522, 38.3, 517, 88, 13.4, 437, 424, 115; 370/311, 470, 252, 335; 375/297, 219

[56] References Cited

U.S. PATENT DOCUMENTS

| | | | |
|---|---|---|---|
| 5,056,109 | 10/1991 | Gilhousen et al. | 455/69 |
| 5,216,692 | 6/1993 | Ling | 375/1 |
| 5,396,516 | 3/1995 | Padovani | 455/69 |
| 5,727,033 | 3/1998 | Weaver et al. | 455/69 |
| 5,901,354 | 5/1999 | Menich et al. | 455/436 |
| 5,982,760 | 11/1999 | Chen | 455/522 |
| 6,034,952 | 6/2000 | Dohi et al. | 455/522 |
| 6,075,974 | 6/2000 | Saints et al. | 455/69 |

*Primary Examiner*—Forester W. Isen
*Assistant Examiner*—Greta J. Fuller
*Attorney, Agent, or Firm*—Steve Cha

[57] ABSTRACT

The present invention discloses a method for improving a call quality by increasing the output of a mobile station over the reverse link by adjusting threshold range of a system's predetermined $E_b/N_o$ value in the event that the transmission output of the mobile station is stopped in a reverse power control of a cellular system, and by comparing the measured $E_b/N_o$ ratio to a predetermined threshold $E_b/N_o$ ratio to increase/decrease the mobile station transmit power. The method includes steps of adjusting the predetermined threshold $E_b/N_o$ ratio by monitoring the call quality in a forward frame, and repeatedly increasing/decreasing the mobile station transmit power accordingly.

15 Claims, 3 Drawing Sheets

FIG. 3

| PATAMETER | SET POINT | CHANGED VALUE | MEANING |
|---|---|---|---|
| pwrctl_nominal | 23408 (8dB) | 34256 (9dB) | INITIALLY ESTABLISHED REVERSE THRESHOLD |
| pwrctl_min | 16168 (7dB) | 11392 (6dB) | REVERSE POWER CONTROL MINIMUM (LOWER BOUND) VALUE |
| pwrctl_max | 61144 (10.5dB) | 109048(12dB) | REVERSE POWER CONTROL MAXIMUM (UPPER BOUND) VALUE |
| pwrctl_down | 24sp | 192 sp | DECREMENT OF Eb/No SET POINT EVERY TWO OR MORE FULL/HALF FRAMES ARE CONTINUOUSLY RECEIVED |
| pwrctl_var_down | 4sp | 16 sp | DECREMENT OF Eb/No SET POINT EVERY TWO OR MORE 1/4, 1/8 FRAMES ARE CONTINUOUSLY RECEIVED |
| pwrctl_up_full | 3720sp | | INCREMENT FOR THE OCCURRENCE OF ERASURE ON CONDITION THAT FULL/HALF FRAMES ARE CONTINUOUSLY RECEIVED |
| pwrctl_up_erasure | 248sp | 1984 sp | INCREMENT IN CASE OF CONTINUOUSLY TWO OR MORE OCCURRENCE OF ERASURE IN IDLE STATE FROM RPC STATE AND FREQUENTLY THAN ERASURE_RUN_LIM |
| pwrctl_up_erasure_little | 50sp | 400 sp | INCREMENT IN CASE OF CONTINUOUSLY TWO OR MORE OCCURRENCE OF ERASURE IN IDLE STATE FROM RPC STATE AND LESS THAN ERASURE_RUN_LIM |
| pwrctl_erasure_run_lim | 5 FRAME | | WHEN THE ERASURE COMES CONTINUOUSLY IN IDLE STATE FROM RPC STATE, IF IT IS LESS THAN THE SET POINT, INCREASED AS MUCH AS PWRCTL_UP_ERASURE_LITTLE, AND IF NOT LESS THAN THE SET POINT, INCREASED AS MUCH AS PWRCTL_UP_ERASURE. |
| pwrctl_full_run_reset | 2 FRAME | | WAITS FOR CONTINUOUS FULL/HALWHEN THE ERASURE COMES CONTINUOUSLY IN IDLE STATE FROM RPC STATE, IF IT IS LESS THAN THE SET POINT, INCREASED AS MUCH AS PWRCTL_UP_ERASURE_LITTLE, AND IF NOT LESS THAN THE SET POINT, INCREASED AS MUCH AS PWRCTL_UP_ERASURE.F FRAMES IN IDLE STATE FROM RPC STATE AS MUCH AS (0X1000 - FULL_RUN_RESET = 2) AND PERFORMS PWRCTL_DOWN |
| pwrctl_full_wait | 1 FRAME | | WAITING VALUE UNTIL THE INCREMENT OF REVERSE THRESHOLD IN ERASURE MODE (FRAME UNIT) |

REVERSE POWER CONTROL METHOD IN A CELLULAR SYSTEM

CLAIM OF PRIORITY

This application makes reference to, incorporates the same herein, and claims all benefits accruing under 35 U.S.C. § 119 arising from an application entitled, REVERSE POWER CONTROL METHOD IN A CELLULAR SYSTEM, earlier filed in the Korean Industrial Property Office on Sep. 15, 1998, and there duly assigned Ser. No. 1998-38062.

FIELD OF THE INVENTION

The present invention relates to a reverse power control method in a cellular system, and particularly, to a method for improving call quality by increasing the transmission output power of a mobile station via a reverse link by continuously adjusting the threshold target value, $E_b/N_o$, used in a reverse power control process.

DESCRIPTION OF THE RELATED ART

As shown in FIG. 1, a cellular system is well known and consist of many types including a plurality of base stations 11, 12, 13 for providing communication services to a mobile station 10, a mobile switching center 15 for connecting the plurality of base stations to a public switched telephone network (PSTN) 14.

As depicted in FIG. 1, it is desirable to maximize the number of subscribers in a given system, while maintaining the mobile station 10 to reach the base stations at a minimum power to avoid interference. If the transmit power of a mobile station 10 received in the base stations 11, 12, 13 is too low, it is not possible to expect a good call quality or to maintain the bit error rate at an acceptable value, and on the other hand, if the received power in the base stations 11, 12, 13 is too high, the call quality of the mobile station 10 would become improved.

In order to maximize the number of subscribers and minimize the interference on the mobile stations, one of the fundamental enabling technologies is power control. The limiting factor for a cellular system capacity is the total interference, and controlling the power of each mobile station is very critical to achieve maximum capacity. That is, mobile stations are power controlled to the minimum power that provides acceptable quality for the given environments so that each mobile station's signal arrives at the base station at approximately equal levels. As a result, the interference from one mobile station to another is held to a minimum. A forward power control is used to control the power from a base station to a mobile station, and a reverse power control is used to control the power from a mobile station to a base station.

The reverse power control is divided into a reverse open loop power control, reverse closed loop power control, and reverse outer loop power control. The reverse open loop power control is based on the similarity of the loss in the forward path to the loss in the reverse path. The loop estimates the total receive power by demodulating the signals such as pilot signal in the frequency band assigned to each mobile station, and adjusts the power so that the transmit power of the mobile station reaches to the base station at a specific strength using the estimated power and the system parameters transmitted by the base station.

In reverse closed loop power control, the base station monitors the power received from each mobile station and commands the mobile station to raise power or lower power by a fixed step of 1 dB, and this process is repeated 800 times per second or every 1.25 msec. The reverse closed loop power control measures the $E_b/N_o$ ratio (bit energy versus interference power spectrum density) received from each mobile station in a demodulator of base station, and the measured ratio is compared to the predetermined target ratio $E_b/N_o$, at an interval of 1.25 millisecond (msec). Thus, if the measured ratio is greater than the predetermined target ratio, the mobile station is ordered to decrease the power through the power control bit by 1 dB. On the other hand, if the measured value is not greater than the target ratio, the mobile station is ordered to increase the power through the power control bit by 1 dB.

Furthermore, the reverse outer loop control involves setting $E_b/N_o$ target value for the closed control loop described above, and monitors the quality of the communication channels performance. As the measured quality of the communication channel degrades below an acceptable threshold, the communication system will command the mobile station to increase its transmit power to compensate. The outer loop power control is generally a slow moving and gradual power adjustment scheme.

However, it has been difficult for the conventional reverse power control to satisfy acceptable signal quality when a quick control is required in relation to features in the 10 environment that reflect the signal because the range of reference threshold $E_b/N_o$ ratio is small. Further, the call quality has been often degraded because the reference $E_b/N_o$ ratio can not be changed quickly to accommodate the field radio environment that is changing too quickly.

SUMMARY OF THE INVENTION

The present invention is intended to provide a method to reduce a call drop rate with a minimization of near-far problem, and obtain a good call quality by increasing the transmit power of a mobile station through the outer loop power control in order to overcome the degradation in a reverse link.

Further, the present invention decreases the transmit power of a mobile station on the good reverse link status to minimize the reverse link coverage of a cell and the capacity reduction, by expanding the range of maximum and minimum of the $E_b/N_o$ set point value from the parameters in the reverse power control of a cellular system.

A preferable embodiment of a reverse power control method in a cellular system according to the present invention includes:

(a) setting a predetermined threshold $E_b/N_o$ ratio having a maximum value and a minimum value in the system parameters;

(b) measuring a $E_b/N_o$ ratio from the mobile station;

(c) comparing the measured $E_b/N_o$ ratio with the predetermined threshold $E_b/N_o$ ratio;

(d) in the event that the measured $E_b/N_o$ ratio is greater than the predetermined threshold $E_b/N_o$ ratio, ordering the mobile station to decrease its transmit power;

(e) in the event that the measured $E_b/N_o$ ratio is not greater than the predetermined threshold $E_b/N_o$ ratio, ordering the mobile station to increase its transmit power;

(f) detecting the signal quality in a forward link to determine whether a good frame is received in one frame duration;

(g) in the event that the good frame is not received in the one frame duration, returning to the step (b) of measuring the value of $E_b/N_o$ from a mobile until the good frame is received in the one frame duration; and, (h) in the event that the good frame is received in the one frame duration, measuring a new $E_b/N_o$ ratio and establishing the newly measured $E_b/N_o$ value as a new predetermined threshold $E_b/N_o$ ratio and returning to the step (b).

According to the preferable embodiment of the present invention, it is preferable that the reverse power threshold and the upper bound value of the reverse power are established to increase at a specific value and the lower bound of the reverse power is established to decrease at same specific value.

According to the preferable embodiment of the present invention, it is preferable that the specific value is 1 dB.

According to the preferable embodiment of the present invention, it is preferable that the step of comparing the predetermined threshold $E_b/N_o$ ratio with the measured $E_b/N_o$ performs the comparison at every 1.24 millisecond (msec).

According to the preferable embodiment of the present invention, it is preferable that the order of increasing or decreasing the transmit power to the mobile station is executed at an increment of 1 dB.

Other preferable embodiment of a closed loop power control method of mobile station and base station according to the present invention includes:

a step of measuring $E_b/N_o$ being received from each mobile station in a demodulator of base station;

a step of comparing the measured value with a specific set point value per every time interval;

a step of ordering the mobile station to decrease power through a power control bit by 1 dB, if the measured value is greater than the set point value;

a step of ordering to increase the power, if the measured value is not greater than the set point value;

a step of receiving the power control bit by the mobile station from two or more base station in a handoff;

a step of increasing the transmit power by the mobile station, if all received bits are '0';

a step of decreasing the transmit power, if at least one bit having a value of '1' among the received bits exists.

BRIEF DESCRIPTION OF THE DRAWINGS

FIG. 3 is a table illustrating the parameters related to the reverse link power control method of the present invention.

DESCRIPTION OF THE PREFERRED EMBODIMENTS

Figure 1:
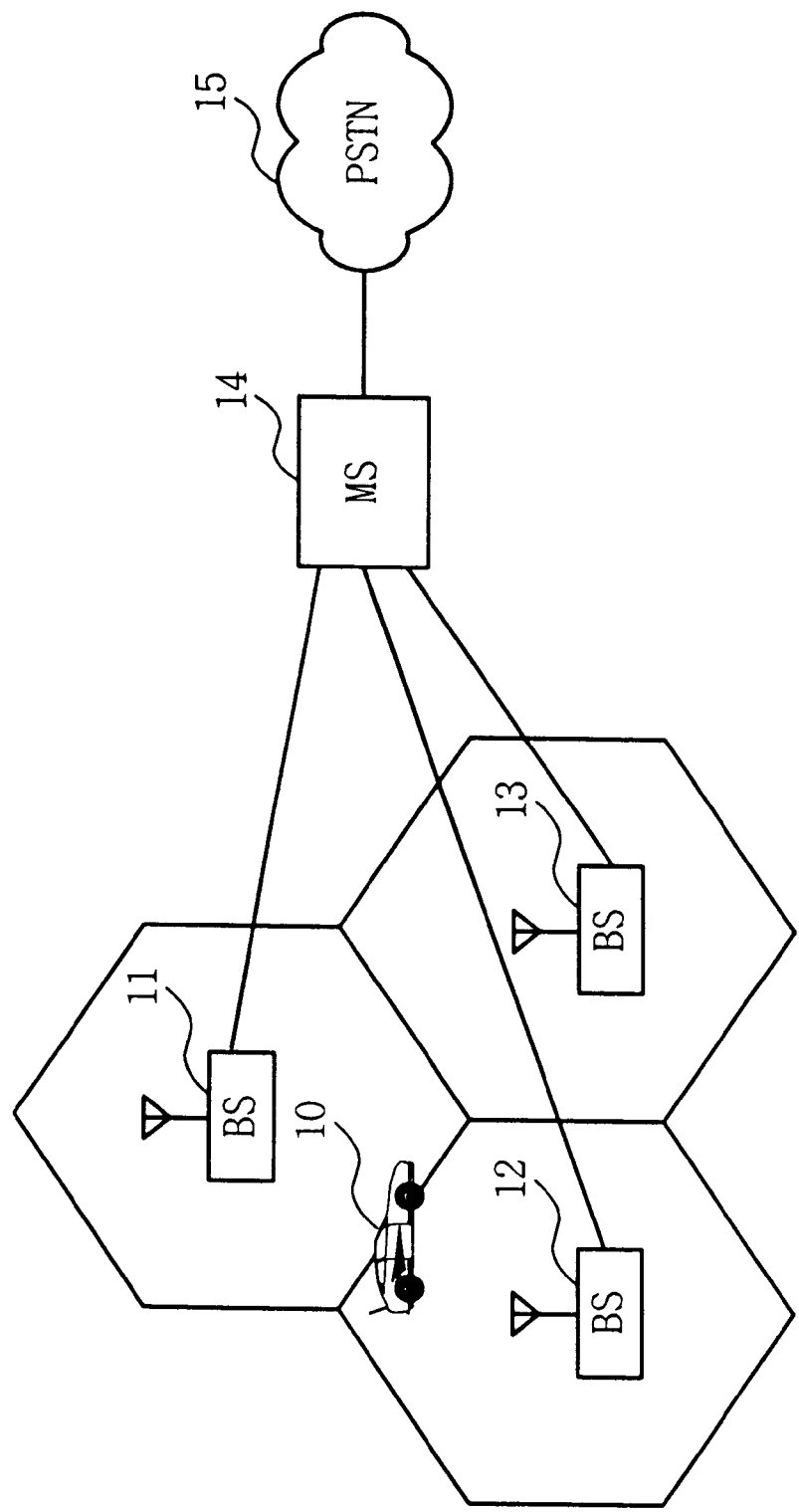
FIG. 1 is a block diagram illustrating the general cellular system.

The present invention improves call quality by expanding the adjustment range of the threshold $E_b/N_o$ ratio used in the outer loop power control scheme, which helps to adapt the environment change more quickly compared to the current known method.

Further, call quality is determined by the frame error rate rather than the signal to noise ratio. It is important to maintain the frame error rate within 1% so as to preserve the good call quality. Additionally, the $E_b/N_o$ value should be adjusted quickly to maintain the frame error rate at an acceptable threshold value. This is achieved by changing the reverse link parameter values and maintaining the changed parameter values so that the frame error rate of the reverse link can be improved promptly by increasing the output of the mobile station to reduce the call drop rate. The major reason that a call is dropped in an actual working field is that the mobile station is released due to the bad frames via a forward link. In the well known art, there is a problem associated with the threshold of the system's $E_b/N_o$ ratio being reached at its maximum set value, 10.5 dB, which results in bad frame occurring via a forward link. Additionally, the main reason of the call drop is caused by a bad frame in the reverse link even though the forward link is in good state. Therefore, it is necessary to increase the $E_b/N_o$ ratio of the mobile station by controlling the reverse power to decrease the call drop rate.

FIG. 3 depicts s a table illustrating the parameters related to the reverse link power control method according to the present invention. According to the present invention, the initial parameter is established, as in step s20, to include a reverse power threshold (pwrctl-nominal) of $E_b/N_o$ having a maximum/upper bound (pwrctl-max) value and a minimum/lower bound (pwrctl-min) value, wherein the upper bound (pwrctl-max) value is increased by 1 dB and the lower bound (pwrctl-min) value is decreased by 1 dB.

As illustrated in FIG. 3, it is possible to improve the call quality by setting the reverse link power control parameters as shown in Table. The parameter in accordance with the present invention are set at 12 dB for the reverse power control maximum value, 6 dB for the reverse power control minimum value, and 9 dB for the initial reverse threshold value. Other changes in the system parameters are depicted in the table of FIG. 3. Also, it is important to select the parameters to make the forward link so that the power control bit can be transmitted over the forward link and that the whole call drop rate can be reduced. That is, when the mobile station enters into an idle/off mode and stops the transmission, the reference threshold $E_b/N_o$ ratio of the reverse link is set higher than the reference ratio prior to the idle state for power control so that the mobile station can receive good frame via forward link. By adjusting the threshold and forward gain during the call or after the completion of the call, the present invention provides ways to minimize call drop rates and improve call quality.

Figure 2:
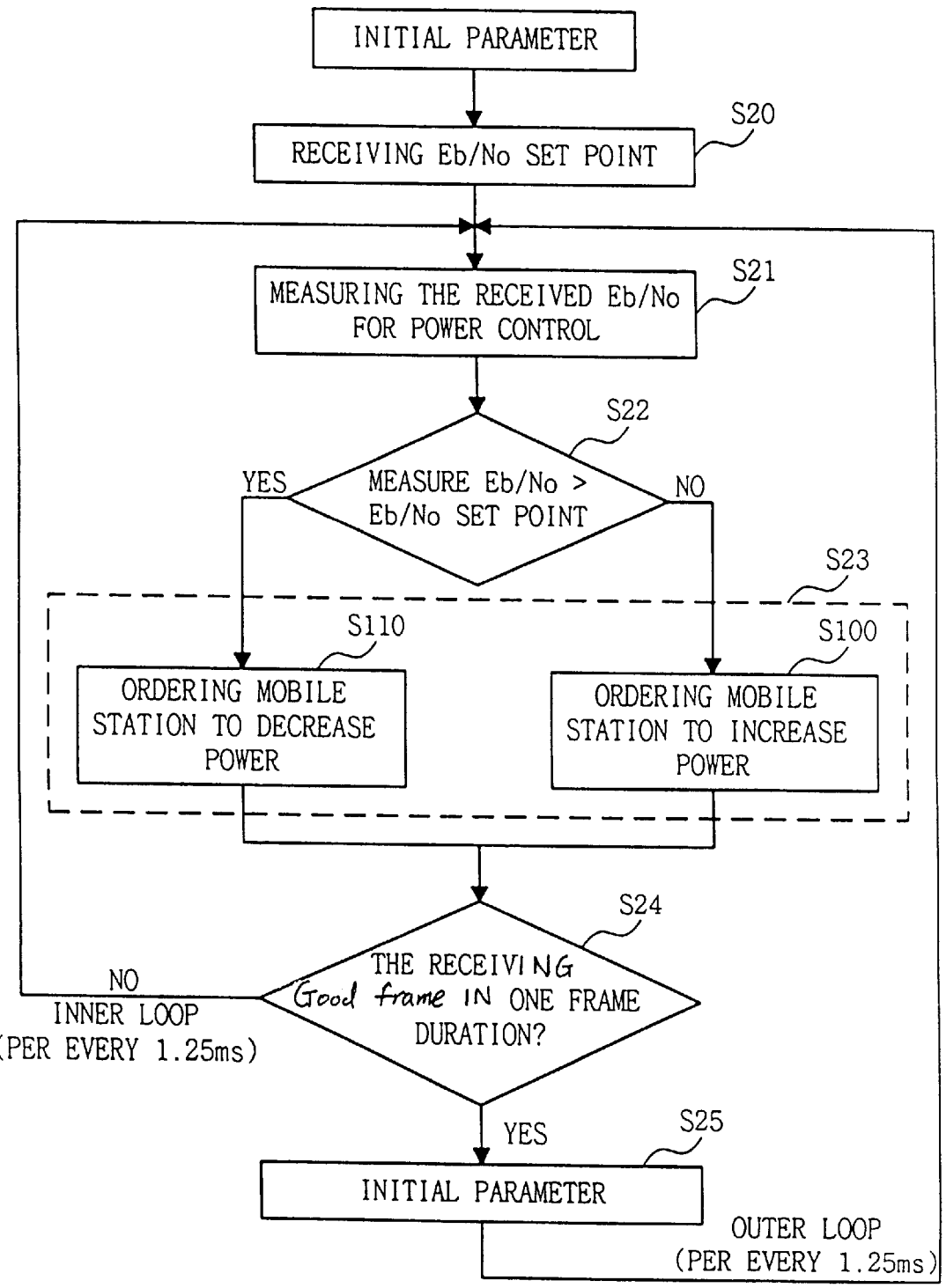
FIG. 2 illustrates a flow chart for the reverse power control method utilized in the present invention.

FIG. 2 depicts a flow chart for the reverse power control in accordance with present invention. A method for controlling a power output level of a mobile telecommunication system includes the following steps: a step of setting reference threshold $E_b/N_o$ ratio in an initial parameter of a reverse power control system in step s20; a step of measuring preset $E_b/N_o$ ratio from a mobile station in step s21; a step of comparing the $E_b/N_o$ ratio measured in the step s21 to the preset $E_b/N_o$ ratio in step s22; a step of ordering the mobile station to decrease its transmit power by 1 dB in step s110, if the $E_b/N_o$ ratio measured in the step s22 is greater than the preset $E_b/N_o$ ratio, and ordering the mobile station to increase its transmit power by I dB s100, if the measured $E_b/N_o$ is not greater than the preset $E_b/N_o$ ratio in step s23; a step of monitoring the quality of received frame in a frame in step s24; a step of controlling the power of mobile station as stated in step s21 through step s23 if a good frame is not detected for the one frame duration in the step s24; and, if good frame is detected during the one frame duration, replacing the old preset $E_b/N_o$ ratio with a newly measured $E_b/N_o$ ratio in step s25.

Furthermore, an operation of the mobile station in steps 100 and 100 in the event that the mobile station receives a large number of power control bits from various base station during a soft handoff is described as follow. In steps 100 and 110, a base station orders an increase/decrease command to adjust the transmission power from the base station to a mobile station, by using a power control bit. The mobile station receives a power control bit from two or more base stations in a soft handoff. Thus, if all received bits are '0', the mobile station increases the transmit power, and if at least one bit having a value of '1' among said received bits exists, the mobile station decreases the transmit power. This is intended to minimize the quantity of interference to the highest degree by transmitting the power required for any one base station among them.

According to one of the preferred embodiment of the present invention, the method includes the following steps:

At step s21, the base station measures $E_b/N_o$ ratio received from a mobile station to perform the power control.

At step s22, the base station compares the initiall preset $E_b/N_o$ ratio to the measured $E_b/N_o$ ratio at an interval of 1.25 msec.

If the $E_b/N_o$ ratio measured from the mobile station is greater than the preset $E_b/N_o$ ratio, it means that the signal of the mobile station has reached at higher power level than the minimum required power of the base station, which causes interference to other mobile stations by degrading the radio link quality of the other mobile stations. Thus, at step s23 (s110), the base station transmits an order to the mobile station to decrease the power by 1 dB using power control bit via forward link.

However, if $E_b/N_o$ ratio measured from the mobile station is not greater than the preset threshold $E_b/N_o$ ratio, it means that the signal of the mobile station has reached at lower power level than the minimum required power of the base station. Therefore, at step s23 (s100), the base station transmits an order to the mobile station s100 to increase the power by 1 dB using power control bit via forward link.

At step s24, the base station determines whether the quality of a frame is at acceptable threshold ratio for one frame duration. At this time, if acceptable quality of the frame/good frame is not completed for the one frame duration, the base station continuously controls the power of the mobile station while measuring the $E_b/N_o$ from the mobile station until a good frame is received/completed for one frame duration.

At step 25, if a good frame is completed for one frame duration, the base station measures a new $E_b/N_o$ ratio and assigns the newly measured $E_b/N_o$ ratio as a new preset threshold $E_b/N_o$ ratio to be used in step s21. Thereafter, the same above functions of increasing and decreasing output power control of the mobile station are executed using the new preset $E_b/N_o$ ratio as a new reference threshold $E_b/N_o$ ratio.

As stated above, the present invention can overcome the reverse link degradation through the outer loop power control by adjusting the preset threshold $E_b/N_o$ ratio higher than the previously predetermined $E_b/N_o$ ratio through setting the reverse maximum $E_b/N_o$ ratio adequate enough to allow such adjustment. That is, the present invention controls the transmit power of mobile station by increasing the preset threshold $E_b/N_o$ ratio more quickly than the conventional method.

Regardless of having good state in the reverse link, if the lowest level of the reverse $E_b/N_o$ is held high, the coverage area of the reverse link is broad and the capacity of a base station is decreased because the transmit power of the mobile station is high. Thus, the present invention has minimized the reverse link coverage of a cell and the capacity reduction through decreasing the transmission power of the mobile station by 1 dB in a good reverse link, by establishing the $E_b/N_o$ of the lower level/bound to be lower than the predetermined $E_b/N_o$.

What is claimed is:

1. A method for controlling a power output level from a mobile station to a base station in a cellular system, said method comprising the steps of:

(i) setting a predetermined threshold $E_b/N_o$ ratio having a maximum value and a minimum value in said system parameters;

(j) measuring a $E_b/N_o$ ratio from said mobile station;

(k) comparing said measured $E_b/N_o$ ratio with said predetermined threshold $E_b/N_o$ ratio;

(l) in the event that said measured $E_b/N_o$ ratio is greater than said predetermined threshold $E_b/N_o$ ratio, ordering said mobile station to decrease its transmit power;

(m) in the event that said measured $E_b/N_o$ ratio is not greater than said predetermined threshold $E_b/N_o$ ratio, ordering said mobile station to increase its transmit power;

(n) detecting the signal quality in a forward link to determine whether a good frame is received in one frame duration;

(o) in the event that said good frame is not received in said one frame duration, returning to said step (b) of measuring the value of $E_b/N_o$ from a mobile until said good frame is received in said one frame duration; and, (p) in the event that said good frame is received in said one frame duration, measuring a new $E_b/N_o$ ratio and establishing said newly measured $E_b/N_o$ value as a new predetermined threshold $E_b/N_o$ ratio and returning to said step (b).

2. The method as set forth in claim 1, wherein said step (c) of comparing said measured $E_b/N_o$ ratio with said predetermined threshold $E_b/N_o$ ratio is executed at every 1.24 millisecond (msec).

3. The method as set forth in claim 1, wherein the maximum value of said predetermined threshold $E_b/N_o$ ratio is set to increase the transmit power at a specific value, and the minimum value of said predetermined threshold $E_b/N_o$ ratio is set to decrease at a specific value.

4. The method as set forth in claim 3, wherein said specific value is 1 dB.

5. The method as set forth in claim 4, wherein said step (c) of comparing said measured $E_b/N_o$ ratio with said predetermined threshold $E_b/N_o$ ratio is executed at every 1.24 millisecond (msec).

6. The method as set forth in claim 3, wherein said ordering of increasing or decreasing the transmit power of said mobile station is done at an increment of 1 dB.

7. The method as set forth in claim 1, wherein the maximum value of said predetermined threshold $E_b/N_o$ ratio is set substantially greater than 12 dB, and the minimum value of said predetermined threshold $E_b/N_o$ ratio is set substantially less than 6 dB.

8. A method for controlling a power output level from a mobile station to a base station in a cellular system, said method comprising the steps of:

(a) measuring $E_b/N_o$ ratio received from each mobile station in a demodulator of base station;

(b) comparing said measured value with a predetermined threshold $E_b/N_o$ ratio at a predetermined time interval;

(c) if said measured ratio is greater than said predetermined threshold ratio, ordering said mobile station to decrease power by 1 dB;

(d) if said measured ratio is not greater than said predetermined threshold ratio, ordering said mobile station to increase the power by 1 dB;

(e) in event that said mobile station receives a power control bit from two or more said base stations during a handoff, increasing the transmission power of said mobile station if all received said power control bits are '0', and decreasing the transmission power of said mobile station if at least one bit having a value of '1' among said received power control bits is detected.

9. A method for controlling a power output level from a mobile station to a base station in a cellular system, said method comprising the steps of:

(a) receiving a signal by a base station;

(b) setting a predetermined threshold $E_b/N_o$ ratio having a maximum value and a minimum value in said system parameters;

(c) measuring a $E_b/N_o$ ratio from said mobile station; (d) comparing said measured $E_b/N_o$ ratio with said predetermined $E_b/N_o$ ratio;

(e) in the event that said measured $E_b/N_o$ ratio is greater than said predetermined threshold $E_b/N_o$ ratio, ordering said mobile station to decrease its transmit power;

(f) in the event that said measured $E_b/N_o$ ratio is not greater than said predetermined threshold $E_b/N_o$ ratio, ordering said mobile station to increase its transmit power;

(g) detecting the signal quality in a forward link to determine whether a good frame is received in one frame duration;

(h) in the event that said good frame is not received in said one frame duration, returning to said step (c) of measuring the value of $E_b/N_o$ from a mobile until said good frame is received in said one frame duration; and, (i) in the event that said good frame is received in said one frame duration, measuring a new $E_b/N_o$ ratio and establishing said newly measured $E_b/N_o$ value as a new predetermined threshold $E_b/N_o$ ratio and returning to said step (c).

10. A method as set forth in claim 9, wherein said system parameter is set according to the table in FIG. 3.

11. A method as set forth in any one of claims 9, wherein said step (d) of comparing said measured $E_b/N_o$ ratio with said predetermined threshold $E_b/N_o$ ratio is executed at every 1.24 millisecond (msec).

12. A method as set forth in claim 9, wherein the maximum value of said predetermined threshold $E_b/N_o$ ratio is set to increase the transmit power at a specific value, and the minimum value of said predetermined threshold $E_b/N_o$ ratio is set to decrease at a specific value.

13. A method as set forth in claim 12, wherein said specific value is 1 dB.

14. A method as set forth in any one of claims 13, wherein said step (d) of comparing said measured $E_b/N_o$ ratio with said predetermined threshold $E_b/N_o$ ratio is executed at every 1.24 millisecond (msec).

15. A method as set forth in claim 12, wherein said ordering of increasing or decreasing the transmit power of said mobile station is done at an increment of 1 dB.

* * * * *